(12) United States Patent
Hortnagl

(10) Patent No.: US 8,245,369 B2
(45) Date of Patent: Aug. 21, 2012

(54) SNAP HOOK

(75) Inventor: Andreas Hortnagl, Fulpmes (AT)

(73) Assignee: Aba Hörtnagl GmbH, Fulpmes (AT)

(*) Notice: Subject to any disclaimer, the term of this patent is extended or adjusted under 35 U.S.C. 154(b) by 287 days.

(21) Appl. No.: 12/623,821

(22) Filed: Nov. 23, 2009

(65) Prior Publication Data

US 2010/0125985 A1    May 27, 2010

(30) Foreign Application Priority Data

Nov. 27, 2008  (AT) ................ A 1850/2008

(51) Int. Cl.
*A44B 13/02* (2006.01)
*F16B 45/02* (2006.01)

(52) U.S. Cl. ............ 24/599.6; 24/599.9; 24/599.5; 294/82.2

(58) Field of Classification Search .......... 24/599.4, 24/599.5, 599.6, 599.9, 600.1, 600.9, 601.1; 294/82.19, 82.2
See application file for complete search history.

(56) References Cited

U.S. PATENT DOCUMENTS

| | | | |
|---|---|---|---|
| 926,156 A * | 6/1909 | Waterhouse | 294/82.2 |
| 1,521,811 A | 1/1925 | Hartbauer | |
| 1,914,189 A * | 6/1933 | Yingling | 294/82.2 |
| 3,114,955 A * | 12/1963 | Ahlquist | 294/82.2 |
| 4,050,730 A * | 9/1977 | Tada et al. | 294/82.2 |
| 4,122,585 A * | 10/1978 | Sharp et al. | 294/82.2 |
| 4,440,432 A * | 4/1984 | Goris | 294/82.2 |
| 4,528,728 A * | 7/1985 | Schmidt et al. | 24/599.4 |
| 7,636,990 B1 * | 12/2009 | Choate | 24/600.1 |
| 2003/0106190 A1 * | 6/2003 | Christianson | 24/600.1 |
| 2008/0005876 A1 * | 1/2008 | Christianson | 24/600.1 |

FOREIGN PATENT DOCUMENTS

| | | |
|---|---|---|
| AT | 400976 | 5/1996 |
| EP | 0515359 | 12/1992 |
| WO | 9113264 | 9/1991 |
| WO | 9519505 | 7/1995 |

* cited by examiner

*Primary Examiner* — Robert J Sandy
*Assistant Examiner* — Michael Lee
(74) *Attorney, Agent, or Firm* — Volpe and Koenig, P.C.

(57) ABSTRACT

A karabiner is provided having a hoop and a closing part mounted pivotally via a pivoting axle to the hoop at the insertion opening of the hoop. At least one blocking element is pivotally mounted to the closing part via a blocking element—pivot axle, with the blocking element, at least in a closed position of the closing part, blocking the closing part in its closed position from pivoting towards its opened position and in at least one released position allows the closing part to pivot towards its opened position. The blocking element is pivoted around the blocking element—pivot axle for pivoting it from the blocking position towards the released position in the same rotary direction around the blocking element—pivot axle as the closing part for pivoting the closing part out of the closed position towards its opened position around the closing part—pivot axle.

23 Claims, 4 Drawing Sheets

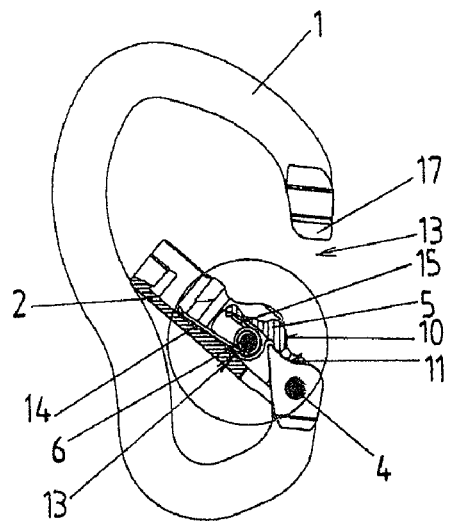
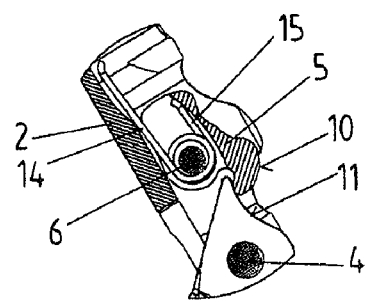
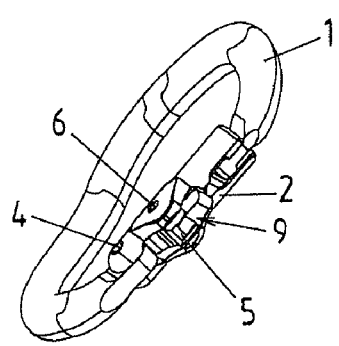
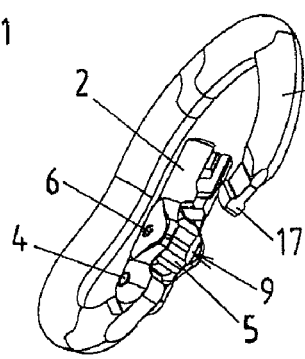
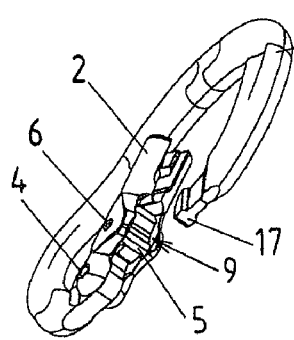

SNAP HOOK

CROSS-REFERENCE TO RELATED APPLICATIONS

This application claims the benefit of Austrian Patent Application No. A1850/2008, filed Nov. 27, 2008, which is incorporated herein by reference as if fully set forth.

BACKGROUND

The present invention relates to a karabiner with at least one hoop and at least one closing part and at least one insertion opening of the hoop, which can be closed off by the closing part in a closed position, with the closing part being pivotally mounted at the hoop via a closing part—pivot axle between the closed position and a maximally opened position, and with at least one blocking element being mounted pivotally at or in the closing part via a blocking element—pivot axle, with in at least one blocking position the blocking element blocks the closing part in its closed position from any pivoting of the closing part in a direction towards its maximally opened position and allows in at least one released position for the closing part to pivot in the direction towards its maximally opened position.

Karabiners are used in the most various embodiments and for various purposes, e.g., in a multitude of sports, such as climbing, ice-climbing, mountain climbing, paragliding, hang-gliding, and the like. They are also used for securing working personnel from falling. In general the hoop of the karabiner is hooked into a rope, an eyelet, or the like. For this purpose, the rope or the eyelet is inserted through the insertion opening into the interior of the hoop. The insertion opening is opened by pivoting open the closing part. When the rope or the eyelet is inside the hoop, the insertion opening can be closed again by pivoting back the closing part. In prior art several safety measures are known intended to prevent that during use of the karabiner the closing part is accidentally pivoted into the open position.

A generic way of securing the closing part is known from the first two exemplary embodiments of WO 95/19505. In this publication, a blocking element is mounted inside of the pivotal closing part, pivotal around a blocking element—pivot axle. This blocking element comprises a handle and a support bar. In the blocking position, the blocking element is in such a position that the support bar contacts a support surface of the hoop. In this blocking position any accidental pivotal opening of the closing part is prevented, the closing part is therefore blocked from any pivoting in the direction towards its maximally opened position. By pressing the handle, the blocking element is pivoted. The interior support bar is released from any engagement with the support surface of the hoop and the closing part can be pivoted around its closing part—pivot axle in the direction of its maximally opened position. A return pivoting occurs via a return spring into the initial position when the closing part and the blocking element are released.

The disadvantage of the above-mentioned generic prior art primarily comprises that when operating the handle of the blocking element, this element is pivoted in a direction towards the support surface arranged at the hoop. This in turn results in the implementation of a very limited and/or small opening angle of the closing part. Furthermore, when operating the handle only a comparatively short lever arm is effective, so that only a relatively weak torque is applied upon the closing part in the pivotal opening direction. For a pivotal opening according to prior art, frequently another operation is necessary directly at the closing part. Therefore, in practice usually the blocking element must be operated with one finger and the closing part with another finger in order to pivot the latter in the direction of the maximally opened position. This is laborious and cumbersome and can even be dangerous, particularly when only one hand is available for operating the karabiner.

SUMMARY

The object of the invention is to provide a generic karabiner allowing a very large opening angle of the closing part, in which the blocking element in its blocking position of the closing part still securely blocks the closing part from any pivoting in the direction to the maximally opened position of the closing part.

This is attained according to the invention in the blocking element being pivotal from the blocking position in the direction towards the released position in the same rotary direction around the blocking element—pivot axis as the closing part for pivoting the closing part out of the closed position in the direction towards its maximally opened position around the closing part—pivot axis.

According to the invention, it is therefore provided that for releasing the closing part, the blocking element is pivoted in the same rotary direction as the closing part when it is pivoted out of its closed position in the direction towards its maximally opened position around the closing part—pivot axis. It is therefore provided that the blocking element is to be pivoted out of the blocking position in the direction towards the released position and the closing part out of the closed position towards its maximally opened position, either both in the clockwise or accordingly both in the counter-clockwise direction. This way, it is avoided that, similar to prior art, when pivoting the blocking element to the maximally possible opening angle of the closing part it is limited by the handle of the blocking element. Further, when pivoting the blocking element according to the invention, a greater torque is applied upon the closing part than in prior art. This allows for the blocking element and the closing part to be simultaneously operated in a single motion of a single finger without requiring the application of a strong force. This also allows a secure and simple one-handed operation.

In particular, it is provided that the blocking element comprises a handle for operating the blocking element and the handle for pivoting the blocking element out of the blocking position in the direction towards the released position is to be pushed or pivoted in a direction away from the closing part—pivot axis.

In order to prevent any unintended pivoting of the blocking element out of the blocking position right from the start it is beneficially provided that the closing part comprises a recess and the handle of the blocking element, and preferably the entire blocking element, is arranged inside said recess. Beneficially the handle and/or the entire blocking element are located entirely inside the recess as indicated, which means that neither the handle nor other parts of the blocking element project from the exterior contours and/or the recess of the closing part. This preferably applies to all positions of the blocking element. Preferred embodiments of karabiners according to the invention provide for the blocking element to include a contact surface contacting a support surface of the hoop. This support surface is beneficially arranged in an end region of the hoop, in which preferably the closing part—pivot axle of the closing part is arranged as well.

Particularly beneficial embodiments provide for the blocking element with its contact surface to roll over the support surface of the hoop when pivoting around the blocking element—pivot axis from the blocking position towards the released position and/or in the opposite direction, preferably in a non-slipping fashion. This rolling may also be provided for only a portion of the pivotal movement, preferably during pivoting around the blocking element—pivot axis from the blocking position in the direction towards the released position during the first part of the pivotal motion. In these embodiments, the blocking element is not only pivoted, particularly in a non-slipping fashion, by the rolling, but it is also moved along the support surface of the hoop in reference thereto. In these embodiments it is therefore not provided for the blocking element to slip or glide past the support surface during pivoting, but a mandatory relative motion is achieved between the support surface and the blocking element during the pivoting of the blocking element.

This can be used in particularly preferred embodiments in order that by this rolling of the contact surface at the support surface during the pivoting of the blocking element from the blocking position in the direction towards the released position, the closing part is mandatorily also pivoted out of the direction of its closed position in the direction towards its maximally opened position. This consequently results in the closing part automatically being pivoted in the direction towards its maximally opened position when the blocking element is pivoted out of its blocking position. Therefore the operation of the blocking element is sufficient to automatically pivot the closing part as well. This is also possible in the opposite direction, of course, by mandatorily pivoting the closing part from its maximally opened position in the direction towards the closed position when the blocking element is pivoted from the released position in the direction towards its blocking position. In these embodiments any operation of the blocking element therefore automatically leads to a pivoting of the closing part. However, contrary thereto this is not provided as long as the blocking element is in its blocking position, because otherwise the blocking element would not fulfill its securing function. It is not necessary for the blocking element to prevent any pivoting of the closing part from a single blocking position only. Rather, it may also be provided that the blocking element, beginning from its first blocking position, blocks the closing part in its closed position against any pivoting of the closing part in the direction towards its maximally opened position in various blocking positions in a pivotal angle within a first angular range around the blocking element—pivot axle this side of a limiting angle. When the blocking element leaves the first angular range it may be provided that the blocking element is mandatorily entrained in a second angular range beyond the limiting angle when the closing part is pivoted in the direction towards its maximally opened position in the direction towards a maximally released position of the blocking element as well. In this second angular range beyond the limiting angle it is then not necessary for the blocking element to mandatorily also being operated for a further pivoting of the closing part. The closing part may also be directly operated, with then the blocking element also being operated in said second angular range by the pivoting of the closing part, by being automatically and/or mandatorily being pivoted. In preferred embodiments the blocking element therefore comprises several blocking positions not only in the first angular range at this side of the limiting angle. Rather, it is also provided in these embodiments that the blocking element in the second angular range beyond the limiting angle can accept several released positions. In preferred variants, the limiting angle amounts to angles smaller or equivalent to 10°, measured between a first connecting straight line between the blocking element—pivot axis and the point of the contact surface of the blocking element with the greatest distance from the blocking element—pivot axis and a second connecting straight line between the blocking element—pivot axis and the closing part—pivot axis. The reference this side of the limiting angle comprises all pivotal angles of the blocking element ranging between the first blocking position of the blocking element and the limiting angle. The reference beyond the limiting angle comprises all pivotal angles located on the opposite side of the limiting angle. The first and the second connecting straight lines each extend through the centers of the respective pivot axis/axes. The limiting angle is generally positioned at the side of the second connecting straight line pointing in the direction towards the first blocking position.

BRIEF DESCRIPTION OF THE DRAWINGS

Additional features and details of a preferred exemplary embodiment of the invention are explained in greater detail using the description of the figures.

In the drawings:

FIGS. 9 and 10 are views of the same exemplary embodiment, with the closing part being in the maximally opened position according to FIGS. 1 through 4;

FIG. 11 is a perspective view of the position of the closing part according to FIGS. 1 through 4;

FIG. 12 is a perspective view in the position according to FIGS. 7 and 8;

FIG. 13 is a perspective view of the karabiner in the position according to FIGS. 9 and 10.

DETAILED DESCRIPTION OF THE PREFERRED EMBODIMENTS

Figure 1:
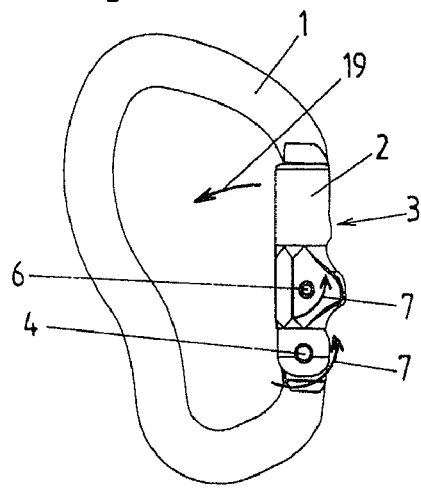
FIGS. 1 through 4 are different views of an exemplary embodiment according to the invention, with the closing part being in the closed position and the blocking element in the first blocking position.

FIG. 1 shows a side view of the karabiner according to the invention. The closing part 2 is pivotally arranged at the hoop 1 via the closing part—pivot axle 4, in FIGS. 1 through 4 the closing part 2 is in its closed position, in which the hoop 1 and the closing part 2 form a closed arrangement. This way, the insertion opening 3, through which a rope or an eyelet or the like can be inserted into the interior of the hoop, can be completely closed. In this side view the blocking element—pivot axle 6 is shown, around which the blocking element 5 can be pivoted. The blocking element 5 itself is not shown, because it is arranged entirely inside the recess 9 in the closing part 2 and thus in the view according to FIG. 1 it is hidden behind the side walls of the closing part 2 limiting the recess. In this perspective it is therefore particularly well discernible that neither the handle 8 nor the other parts of the blocking element 5 project from the recess 9.

Figure 2:
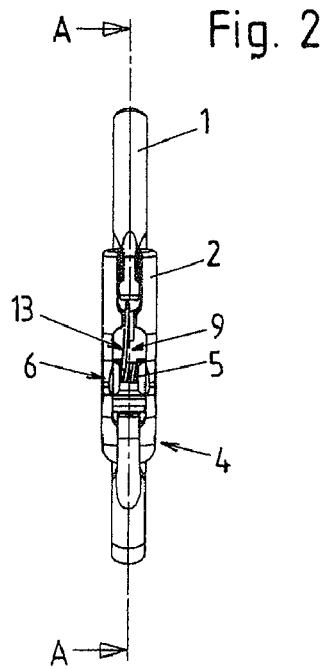

FIG. 2 shows a view of the karabiner from the front. In this view the recess 9 is discernible in the closing part 2. The blocking element 5 as well as the return spring 13 are arranged therein. FIG. 2 also shows the cross-sectional line A-A along which the closing part 2 and the blocking element 5 are sectioned in the illustrations of FIGS. 3 through 10. FIG. 4 shows the area B of FIG. 3 enlarged. Here the blocking element 5, illustrated in cross-section, is particularly well discernible, pivotally mounted around the blocking element—pivot axis 6 in the recess 9. It comprises the handle 9, which can be impinged e.g., with the thumb or another finger. Additionally, the return spring 13 is also shown, which in the exemplary embodiment shown is provided for a reverse pivoting of the closing part 2 into its closed position as well as the blocking element 5 into its blocking position. It therefore represents a single common return spring 13. In other exemplary embodiments separate return springs for the closing part and the blocking element may be provided, of course. In the exemplary embodiment shown, the return spring 13 comprises a first leg 14 and at least one second leg 15. The first leg 14 contacts the closing part 2, and the second leg 15 contacts the blocking element 5. The return spring 13 contacts the blocking element—pivot axle 6 in the area between the legs 14 and 15. In the exemplary embodiment shown, it is wound in this area around the blocking element—pivot axle 6. The blocking element—pivot axle 6 is mounted in a fixed manner at the closing part 2. In the exemplary embodiment shown, the closing part—pivot axle 4 is mounted at the hoop 1 in a fixed manner, namely in the variant shown in the same end region 12 of the hoop 1, in which said part also comprises the support surface 11. The blocking element 5 contacts this support surface 11 of the hoop 1 with its contact surface 10. In the exemplary embodiment shown, the blocking element 5 exhibits in its cross-section a pin-like extension 18, with its exterior surfaces comprising the contact surface 10, and/or at least partially forming it. In the exemplary embodiment shown the contact surface 10 extends from one side of the pin 18 to the opposite side of the pin 18.

In FIGS. 1 through 4, the blocking element 5 is in its first blocking position. With a part of its contact surface 10 it contacts an upper end region of the support surface 11, namely such that when it is attempted to pivot the closing part 2 in the direction 19 towards its maximally opened position the blocking element 5 prevents such a pivotal motion and the closing part 2 is therefore blocked in its closed position. The blocking effect results from the fact that when it is attempted to pivot the closing part 2 in the direction 19, the blocking element—pivot axle 6, arranged in a fixed manner at the closing part 2, had to be pivoted in the direction 19 as well, which however is prevented by the contact of the contact surface 10 of the blocking element 5 at the support surface 11 of the hoop 1. As long as the blocking element 5 is situated in a blocking position the closing part 2 cannot leave its closed position. As particularly discernible in FIGS. 3 through 10, the return spring 13 applies a force upon the blocking element 5 in all positions, pressing the contact surface 10 of the blocking element 5 in the direction and/or against the support surface 11 of the hoop 1 and/or to the support surface 11 of the hoop 1. The support surface 11 is beneficially implemented as shown, comprising a constantly curved surface. This means that there are no edges, but this does not exclude that, as shown in the exemplary embodiment, it may have a curve radius varying over the extension. The support surface 11 forms an exterior surface of a wedge-shaped projection of the hoop 1, which points with the tip of its wedge in the direction towards the opposite end region 20 of the hoop 1. The support surface 11 is arranged in the area between the blocking element—pivot axle 6 and the closing part—pivot axle 4.

In order for allowing the closing part 2 to leave the closed position shown in FIGS. 1 through 4, first the blocking element 5 must be brought into a released position by operating the handle 8. This occurs by pivoting the blocking element 5 in the rotary direction 7 around its blocking element—pivot axle 6. According to the invention, the above-mentioned rotary direction 7 represents the rotary direction 7, in which the closing part 2 must be pivoted around its closing part—pivot axle 4 to be pivoted from the closed position in the direction towards its maximally opened position.

Figure 3:
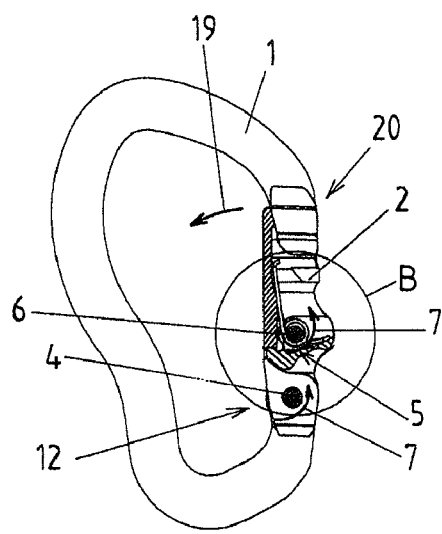
Figure 4:
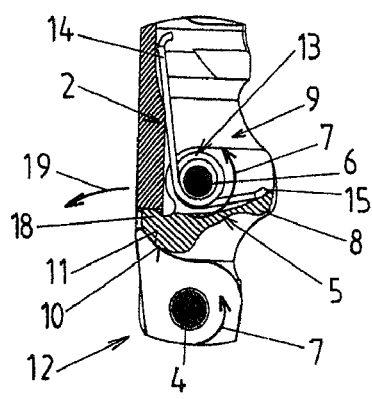
Figure 5:
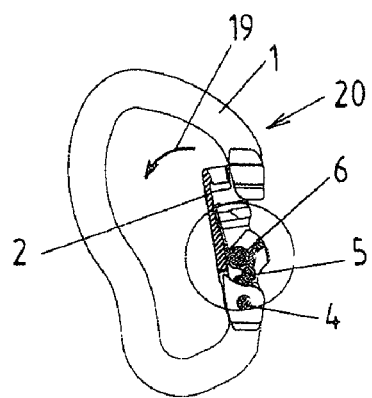
FIGS. 5 and 6 are views of the same exemplary embodiment with the blocking element being pivoted towards the limiting angle.
Figure 6:
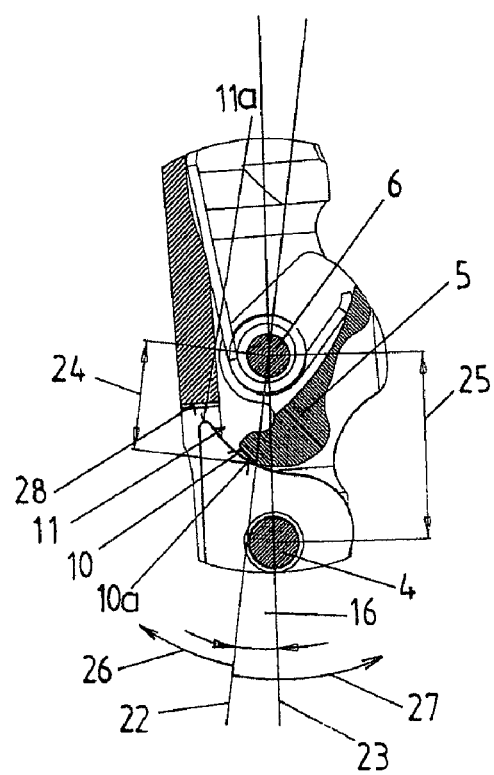

FIGS. 5 and 6 show cross-sectional illustrations according to FIGS. 3 and 4, with the blocking element 5 however no longer being in its first blocking position but situated in the blocking position equivalent to the limiting angle 16. The first angular range of the pivotal angle of the blocking element 5 ranges from the positions shown in FIGS. 3 and 4 and those of FIGS. 5 and 6, in which the blocking element 5 is respectively arranged in a blocking position. This means that in all of these positions the blocking element 5 of the closing part 2 is still hindered from any pivoting in the direction 19. In all these positions of the blocking element 5 the closing part 2 may still be situated in its closed position according to FIG. 1. However, it is also possible, as discernible from FIGS. 5 and 6, that in the area of the limiting angle 16 the closing part 2 is already slightly pivoted in the direction 19, with beneficially the closing part 2 in the end region 20 still overlaps the loop. In this first angular range and/or in the blocking positions a force develops attempting to pivot the closing part 2 in the direction 19, i.e. in the direction of its maximally opened position, by pressing the contact surface 10 to the support surface 11, either creates a torque upon the blocking element, which acts in the direction of the first blocking position or a torque upon the blocking element 5 in the opposite direction thereto, i.e. in the direction of the released position, which is weaker than the friction created by the compression of the contact surface 10 against the support surface 11. This way, the desired blocking effect of the blocking element 5 is created.

FIG. 6 shows enlarged the area, marked with a circle in FIG. 5, in order to use it for explaining the position of the limiting angle 16. The point (and/or the line and/or the partial area) of the contact surface 10 with the greatest distance 24 from the blocking element—pivot axle 6 and/or its center is marked with the reference character 10a. The first connecting straight line 22 extends through said point 10a and the blocking element—pivot axle 6 and/or its center. The second connection straight 23 extends between the blocking element—pivot axle 6 and/or its center and the locking element—blocking axle 4 and/or its center. The distance between the centers of the blocking element—pivot axle 6 and the locking element—pivot axle 4 is marked with the reference character 25. The limiting angle 16 is measured between the first connecting straight line 22 and the second connecting straight line 23. In the exemplary embodiment shown it amounts to approx. 8° and generally ranges beneficially from 0° to 10° (inclusive). The first angular range at this side of the limiting angle 16 ranges from the first blocking position to the first connecting straight line 22 and is marked by the arrow 26. In this angular range 26 the blocking element 5 is always in its blocking position. The second angular range beyond the limiting angle 16 is located on the opposite side of the first connecting straight line 22 and is marked by the arrow 27. In this second angular range the blocking element 5 is in its released position. The limiting angle 16 is generally positioned on the side of the second connecting straight line 23, which points in the direction 26 towards the first blocking position.

Without considering any play between the axial bolt of the blocking element—pivot axis 6 and the closing part—pivot axle 4 and the axial bores in which the axial bolts are supported, the limiting angle would amount to 0°, which then would represent the limiting angle 16 when the point 10a coincided with the second connecting straight line 23. In practice, a certain play must be allowed for reasons of tolerance. However, this play should be selected for the limiting angle not exceeding 10°, though. When no play is present, there is the risk that the blocking element 5 with its contact surface 10 might jam at the support surface 11 due to the wedge-effect, which generally can only be released with considerable force.

At least for a portion, preferably the first portion, of the pivotal motion of the blocking element 5 out of the first blocking position according to FIGS. 1 through 4 towards the limiting angle 16 according to FIGS. 5 and 6 and further in the direction of the released position according to FIGS. 7 through 10 the blocking element 5 rolls with its contacting surface 10 over the support surface 11 of the hoop 1, preferably in a non-slipping fashion. The rolling first leads to a mandatory coupling of the pivotal motion of the blocking element 5 around the blocking element—pivot axle 6 to a pivotal motion of the entire blocking element 5 around the closing part—pivot axle 4. Due to the fixed mounting of the blocking element—pivot axle 6 at the closing part 2 this in turn results in a mandatory coupling of the closing part 2 to the rotary motion of the blocking element 5 and thus to a pivoting of the closing part 2 around the closing part—pivot axle 4. At least in the second angular range above the limiting angle 16, the rolling of the contact surface 10 over the support surface 11, when pivoting the blocking element 5 from the direction of the blocking position towards the direction of the maximally possible released position, leads to the closing part 2 mandatorily being also pivoted out of the direction of its closed position towards the direction of its maximally opened position. Therefore, it is not necessary for the closing part 2 to be pivoted in the direction 19 by a separately applied force. This occurs automatically by pivoting the blocking element 5 around its blocking element—pivoting axle 6 in the rotary direction 7.

Figure 7:
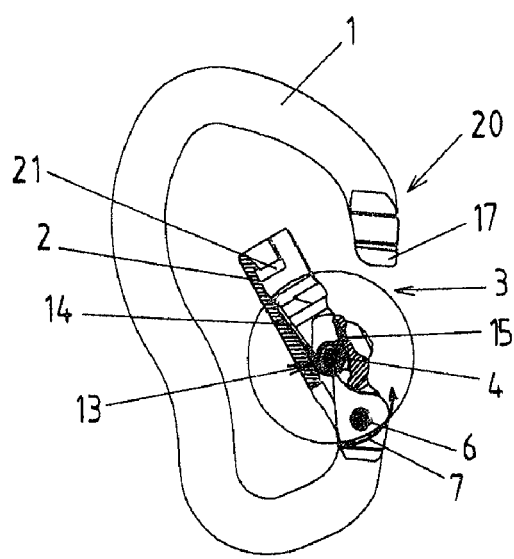
FIGS. 7 and 8 are views of the same exemplary embodiment again in a position, in which the closing part has already been pivoted by a certain angle in the direction towards the maximally opened position.
Figure 8:
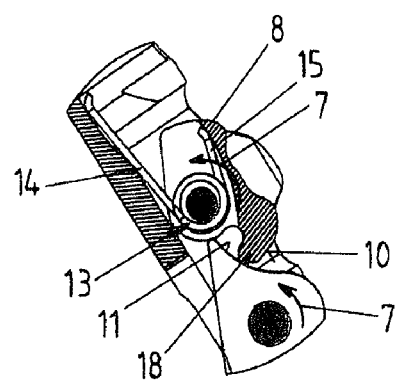

FIGS. 7 and 8 show an intermediate position, in which the blocking element 5 is situated in a second angular range above the limiting angle 16. The closing part 2 is situated in its partially opened position, such that the insertion opening 3 has already been partially released. The return spring 13 is situated in a status even further compressed in reference to FIGS. 3 through 6. In all positions it counteracts any deviating motions in the rotary direction 7. In FIG. 7 the upper end region 20 of the hoop 1 is freely discernible. It carries, as generally known, a bulge 17, which can be undercut by a respective shoulder 21 of the closing part 2. This serves, as generally known, to increase the tensile strength of the karabiner when the closing part 2 is in its closed position.

Beyond the limiting angle 16, the user is free in the second angular range of the karabiner to engage the handle 8 or directly the closing part 2 for any further pivoting of the closing part 2 and the blocking element 5. In this second angular range both options allow to bring the closing part 2 into the maximally opened position shown in FIGS. 9 and 10. When the handle 9 is operated in the rotary direction 7, a corresponding further opening of the closing part 2 occurs automatically by the rolling of the blocking element 5 at the support surface 11. However, if the closing part 2 is directly operated, in this second angular range the blocking element 5 is automatically pivoted further in the rotary direction 7 around its blocking element—pivot axle 6. The latter applies, as already explained, only for the second angular range above the limiting angle 16.

In order to return the closing part 2 into its closed position and the blocking element 5 into its first blocking position according to FIGS. 1 through 4, the closing part 2 and the blocking element 5 must simply be released. The return spring 13 automatically ensures the resetting by rotating the blocking element 5 against the direction 7 around its blocking element—pivot axle 6, with in this resetting process, too, the contact surface 10 rolls at least partially over the support surface 11, preferably in a non-slipping fashion.

FIGS. 11 through 13 show perspective views of the karabiner of this exemplary embodiment according to the invention. FIG. 11 shows the position according to FIGS. 1 through 4, FIG. 12 the position according to FIGS. 7 and 8, and FIG. 13 the position according to FIGS. 9 and 10. In these illustrations it is particularly well discernible that the recess 9 in the closing part 2 comprises a width such that the handle 8, which does not project from the recess 9, can be operated with one finger.

Figure 14:
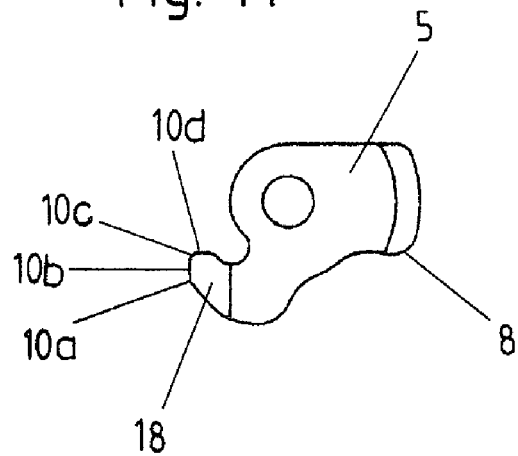
FIGS. 14 and 15 are views of the blocking element.
Figure 15:
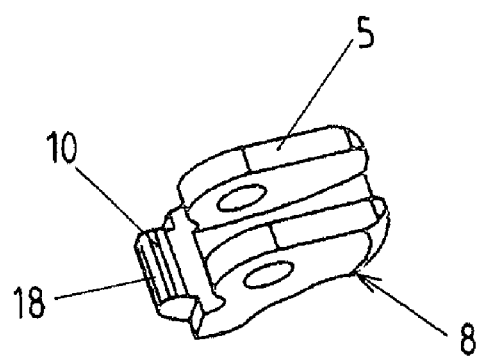

FIG. 14 shows a side view of the blocking element 5, and FIG. 15 shows a perspective view. In FIG. 14 various points and/or sections 10a through 10d of the contact surface 10 of the blocking element 5 are marked separately. In the closed position of the closing part 2 and thus in the first blocking position of the blocking element 5, the blocking element 5 with its area 10d contacts the surface 28, marked in FIG. 6, without any play. By operating the blocking element 5 during the opening process the surfaces in the area of the point 10a and the area 10b roll on the support surface 11 of the hoop 1, beginning at the first blocking position. Until the limiting angle 16 is reached, the blocking element 5 is here always situated in a blocking position, in which the closing part 2 cannot be further opened by any directly applied force. When the limiting angle 16 is exceeded the closing part 2 can be further opened by a directly impinging force. After 10a and 10b, a portion of the area 10c rolls on the surface 11 of the hoop 1 and transfers into a gliding motion during any further opening. In an almost complete opening of the closing part 2 the area 10d also glides over the surface 11 of the hoop. In a particularly preferred variant with a particularly large opening angle in the maximally opened position of the closing part 2 it may be provided that the area 10d glides over the area marked 11a in FIG. 6 at the support surface 11 of the hoop 2.

Legend for the Reference Characters 1 hoop
2 closing part
3 insertion opening
4 closing part—pivot axle
5 blocking element
6 blocking element—pivot axle
7 rotary direction
8 handle
9 recess
10 contact surface
10a point of the contact surface
10b area of the contact surface
10c area of the contact surface
10d area of the contact surface
11 support surface
11a area of the support surface
12 end region
13 return spring
14 first leg
15 second leg
16 limiting angle
17 bulge
18 pin
19 direction
20 end region 21 shoulder
22 first connecting straight line
23 second connecting straight line
24 distance
25 distance
26 first angular range
27 second angular range
28 surface

The invention claimed is:

1. A karabiner comprising at least one hoop (1) and at least one closing part (2) and at least one insertion opening (3) of the hoop (1), which can be closed by the closing part (2) in a closed position, the closing part (2) being pivotally mounted at the hoop (1) via a closing part—pivot axle (4) for movement between the closed position and a maximally opened position, at least one blocking element (5) being pivotally mounted at or in the closing part (2) via a blocking element—pivot axle (6), with at least in one blocking position the blocking element (5) blocks the closing part (2) in the closed position of the closing part (2) from pivoting in a direction towards the maximally opened position and in at least one released position of the blocking element allows pivoting of the closing part (2) in a direction towards the maximally opened position, the blocking element (5) is pivotable out of the blocking position in the direction towards the released position in a same rotary direction (7) around the blocking element—pivot axle (6) as the closing part (2) for pivoting the closing part (2) out of the closed position in the direction towards the maximally opened position around the closing part—pivot axle (4), and at least one common return spring (13) for pivoting the closing part (2) back into the closed position and the blocking element (5) into the blocking position.

2. A karabiner according to claim 1, wherein the blocking element (5) comprises a handle (8) for operating the blocking element (5) and the handle (8) for pivoting the blocking element (5) out of the blocking position in the direction towards the released position must be pushed or pivoted in a direction away from the closing part—pivot axle (4).

3. A karabiner according to claim 2, wherein the closing part (2) comprises a recess (9) and the handle (8) or the entire blocking element (5) is arranged inside the recess (9).

4. A karabiner according to claim 3, wherein the handle (8) or the entire blocking element (5) is arranged entirely inside the recess (9).

5. A karabiner according to claim 3, wherein the handle (8) or the entire blocking element (5) is arranged inside the recess (9) in all positions of the blocking element (5).

6. A karabiner according to claim 1, wherein the blocking element (5) comprises a contact surface (10), by which it contacts the hoop (1) at a support surface (11) thereof.

7. A karabiner according to claim 6, wherein the support surface (11) is arranged in an end region (12) of the hoop (1).

8. A karabiner according to claim 7, wherein the closing part—pivot axis (4) is arranged in the end region (12) of the hoop (1).

9. A karabiner according to claim 1, wherein the return spring (13) comprises a first leg (14) and at least one second leg (15), with the first leg (14) contacting the closing part (2) and the second leg (15) contacting the blocking element (5).

10. A karabiner according to claim 1, wherein the return spring (13) is mounted on the blocking element—pivot axle (6).

11. A karabiner according to claim 10, wherein the return spring (13) is mounted at the blocking element—pivot axle (6) in an area between the legs (14, 15).

12. A karabiner according to claim 10, wherein the return spring (13) is wound around the blocking element—pivot axle (6).

13. A karabiner according to claim 1, wherein the blocking element (5) comprises a contact surface (10), by which the blocking element contacts the support surface (11) of the hoop (1) and the return spring (13) presses the contact surface (10) of the blocking element (5) against the support surface (11) of the hoop (1).

14. A karabiner according to claim 6, wherein the contact surface (10) of the blocking element (5) rolls over the support surface (11) of the hoop (1) when pivoted around the blocking element—pivot axle (6) from the blocking position in the direction towards the released position or in the opposite direction or in both of these directions at least during a part of the pivotal motion.

15. A karabiner according to claim 14, wherein the part of the pivotal motion is the first part of the pivotal motion.

16. A karabiner according to claim 14, wherein the contact surface (10) of the blocking element (5) rolls over the support surface (11) of the hoop (1) in a non-slipping fashion.

17. A karabiner according to claim 14, wherein by rolling of the contact surface (10) over the support surface (11), the closing part (2) also mandatorily pivots from the direction of the closed position in the direction towards the maximally opened position when the blocking element (5) is pivoted from the blocking position in the direction towards the released position.

18. A karabiner according to claim 14, wherein due to the rolling of the contact surface (10) over the support surface (11), the closing part (2) mandatorily also pivots from the direction of the maximally opened position in the direction towards the closed position when the blocking element (5) is pivoted from the released position in the direction towards the blocking position.

19. A karabiner according to claim 1, wherein the blocking element (5), beginning at a first blocking position, blocks the closing part (2) in the closed position from any pivoting of the closing part (2) in the direction towards the maximally opened position in various blocking positions in a first angular range (26) of a pivotal angle around the blocking element—pivot axle (6) at a first side of the limiting angle (16).

20. A karabiner according to claim 19, wherein in a second angular range (27) beyond the limiting angle (16), the blocking element (5) also pivots when the closing part (2) is pivoted in the direction towards the maximally opened position in the direction towards a maximally released position.

21. A karabiner according to claim 19, wherein the limiting angle (16) is smaller or equal to 10°, with the limiting angle (16) being measured between a first connecting straight line (22) between the blocking element—pivot axle (6) and a point (10a) of the contact surface (10) of the blocking element (5) having the greatest distance (24) from the blocking element—pivot axle (6) and a second connecting straight line (23) between the blocking element—pivot axle (6) and the closing part—pivot axle (4).

22. A karabiner according to claim 6, wherein the support surface (11) of the hoop (1) representing a constantly curved surface.

23. A karabiner according to claim 6, wherein the support surface (11) of the hoop (1) is arranged between the blocking element—pivot axle (6) and the closing part—pivot axle (4).

* * * * *